(12) United States Patent
Wendt et al.

(10) Patent No.: US 6,564,852 B1
(45) Date of Patent: May 20, 2003

(54) METHOD AND DEVICE FOR DIRECTLY PRODUCING AN INVESTMENT CASTING MOLD FOR CASTING MADE OF METAL

(75) Inventors: Florian Wendt, Frieberg (DE); Norbert Demarczyk, Grumbach (DE); Rüdiger Hauschild, Naundorf (DE)

(73) Assignee: Actech GmbH - Advanced Casting Technologies Giessereitechnologie (DE)

( * ) Notice: Subject to any disclaimer, the term of this patent is extended or adjusted under 35 U.S.C. 154(b) by 0 days.

(21) Appl. No.: 09/719,013

(22) PCT Filed: Jun. 4, 1999

(86) PCT No.: PCT/DE99/01709

§ 371 (c)(1),
(2), (4) Date: Apr. 4, 2001

(87) PCT Pub. No.: WO99/64188

PCT Pub. Date: Dec. 16, 1999

(30) Foreign Application Priority Data

Jun. 6, 1998 (DE) .......................... 198 25 448

(51) Int. Cl.⁷ .............................. B22D 7/00; B22D 9/02
(52) U.S. Cl. .............................. 164/17; 164/4.1; 164/45
(58) Field of Search .............................. 164/45, 17, 4.1

(56) References Cited

U.S. PATENT DOCUMENTS 5,796,620 A * 8/1998 Laskowski et al. ......... 700/118

* cited by examiner

*Primary Examiner*—Kuang Y. Lin
(74) *Attorney, Agent, or Firm*—George W. Neuner, Esq.; Edwards & Angell, LLP (57) ABSTRACT

The invention is directed to a method for directly producing a lost mold by machining a sand mold made with curable binders. The invention is intended in particular to decrease tool wear and to increase dimensional accuracy and exactness in the reproduction of the mold, in that a mold blank (1) to be machined is constructed by means of a pattern set (4) with the use of a variable or fixed molding box (2) and includes in its volume the desired contours of the casting mold and a machining allowance for the milling of the mold material. After filling of the molding box (2) with curable foundry mold materials, curing, and removal from the mold, the mold blank (1) is transformed into the casting mold by removal of the machining allowance by high-speed machining, milling or 3-D machining of freeform surfaces. The invention concerns lost molds for metal castings and the fabrication of casting prototypes and odd parts in the range of small-and medium-sized articles and production runs.

8 Claims, 8 Drawing Sheets

Schnitt A-A

METHOD AND DEVICE FOR DIRECTLY PRODUCING AN INVESTMENT CASTING MOLD FOR CASTING MADE OF METAL

BACKGROUND OF THE INVENTION

The invention concerns a method and a device for directly producing a lost mold for metal castings and for fabricating casting prototypes and odd parts in the range of small- to medium-sized articles and production runs by machining a sand mold made with the use of curable binders.

Lost molds for casting prototypes and odd parts are made according to DE 43 41 325 A 1 as foam patterns by means of a numerically controlled milling machine. The numerically controlled milling machine includes a cutter that can be moved in the three spatial directions by means of a portal arrangement. To ensure fast and accurate machining of the workpiece, the polystyrene-foam particles milled from a foam block are exhausted directly from the area of the cutter. To suction off remaining stock, the cutter is implemented as a hollow body with exhaust openings and is connected by lines to an exhaust system. Since the tool costs involved in manufacturing the cutter are comparatively high, foundry-sand casting molds cannot be made by this method. The high wear occasioned by machining a lost mold would adversely affect accuracy of shape and would entail substantial tool costs. In addition, foam patterns are not suitable for small castings. Thin-walled and complex structures are difficult to make. The extreme brittleness of the pattern is a disadvantage, and its elasticity can lead to large dimensional deviations. The foundry must be specially equipped to ensure environmental safety.

To be able to produce a sand mold without a master pattern, it was proposed in DE 26 05 687 C 3 to ram the molding sand into a molding box and to hollow out the mold cavity with cutting and milling tools operatively connected to a profiling or copying milling machine. To reduce tool wear, it was further proposed that the sand block be hollowed out when the compressive strength was 2–10 kg/cm$^2$, preferably 2–5 kg/cm$^2$. This means that the machining must be done before the binder is completely set, but when acceptable strength has nevertheless been attained. This approach is impossible to control technologically and is associated with numerous sources of error. For this reason, the machining of uncured sand molds has failed to win acceptance in practice. Moreover, the tool used to hollow out the sand block, which is detailed in the description of the invention, comprises a knife rotating about a vertical axis, by means of which only ordinary cylindrical shapes can be produced.

German Unexamined Patent Application DE 196 49 428 A1 offered a proposal for producing molds for large and complex castings without the use of a prototype pattern set, which consisted in machining a sand block with compressive strength in the range of 20 to 80 kg/cm$^2$, particularly 40 to 60 kg/cm$^2$. Since a casting mold made of foundry sand containing a conventional proportion of binder and cured under normal conditions ordinarily has a compressive strength of at least 60 kg/cm$^2$, the range of compressive strength values cited as preferable relates to an incompletely cured sand mold or to a mold with a comparatively low binder content, in order to increase tool life. Either approach is beset by major disadvantages in exact mold production, owing to the low strength of the mold.

The method is characterized by the fact that a block of compacted powdered granulate material is prepared with an automatic processing machine. A tool-changer and an exhaust system for the removed stock in the vicinity of the machining operation are cited. The powdered granulate is specified as a special sand material cemented in the form of a right parallelepipedal block by means of binders such as water glass cured with $CO_2$ gas or hardeners such as furan resin cured with oxygen, and is present in compacted form. The processing machine has a type of machine-tool control. CAM software is used to generate a program on the basis of which the machining is performed. The program for the mold to be produced can be created on the basis of drawings or from CAD data.

The disadvantages of directly machining a block of sand material by means of the proposed automatic processing machine lie in the high tool wear manifested in the patent, a phenomenon that can be reduced only by lowering the strength of the sand block. The machining must therefore be done within the curing time, which is likewise very problematic for technical reasons. A casting mold that utilizes a rapidly curing mixture of mold materials with a very short curing time is therefore impracticable. The proposed solution is limited to the preferred use of $CO_2$ or furan-resin mold materials, and thus not all of the candidate foundry mold materials can be used.

SUMMARY OF THE INVENTION

The invention, which is intended to avoid or palliate the aforesaid disadvantages of the prior art, is directed to a method and a device for directly producing a lost mold by machining a sand mold made nonrestrictively with the use of curable binders. In particular, the invention is intended to reduce tool wear and to minimize the attendant tool costs, as well as to increase dimensional accuracy and exactness in the reproduction of the mold.

The object is accomplished by means of the machining method of direct milling of the mold material which is characterized in that a mold blank is produced by means of a pattern set with the use of a variable or fixed molding box, said mold blank having the contours of the casting mold plus a machining allowance for the milling of the mold material. After the molding box has been filled with the curable foundry-mold materials and curing and removal from the mold have taken place, the resulting mold blank is transformed into the casting mold by high-speed machining, milling or 3-D machining of freeform surfaces.

The proposed machining method of direct milling of the mold material yields a novel set of properties for casting molds made with known high-speed-machining technologies, including quantitative and qualitative properties which, according to a further feature of the invention, are attributable to the fact that the mold blank is machined in the cured state, in which its compressive strength is at least 60 to 80 kg/cm$^2$.

Characteristic of the milling of the mold material, therefore, is the production of mold contours in cured foundry mold material. The accumulation of removed stock in the machining area is detrimental to automation of the milling operation. The consequences are inaccuracies in the surface contour of the casting mold, increased tool wear, or damage to the machine. The production of mold blanks keeps stock removal to a minimum. Removed stock tends not to accumulate. The production of mold blanks has further advantages characterized by economization of mold material and energy, minimization of waste and dust, minimization of wear on tools and machines and reduction of machining times. In addition, particular economic efficiency is achieved in the case of large-volume molds and castings.

It is further provided within the scope of the invention that the term "direct milling of mold material" encompasses not only the milling of foundry mold materials per se, but also a technological series of processes and devices for producing lost molds. This includes the production of mold blanks by means of a variable pattern set from an arrangement of parallelepipedal segments, cubic segments, threaded bolts or clampable round rods, as well as the evacuation of removed stock. A prerequisite for the industrial application of direct milling of mold material is the availability of specialized equipment for making the mold blanks and for machining them in the processing machine, which will be explained in more detail hereinbelow by means of several exemplary embodiments. Further advantages and embodiments of the invention will emerge from the dependent claims and the exemplary embodiments.

BRIEF DESCRIPTION OF THE DRAWINGS

The appended drawings are schematic illustrations, respectively, of.

DETAILED DESCRIPTION OF THE INVENTION INCLUDING PREFERRED EMBODIMENTS

Figure 1:
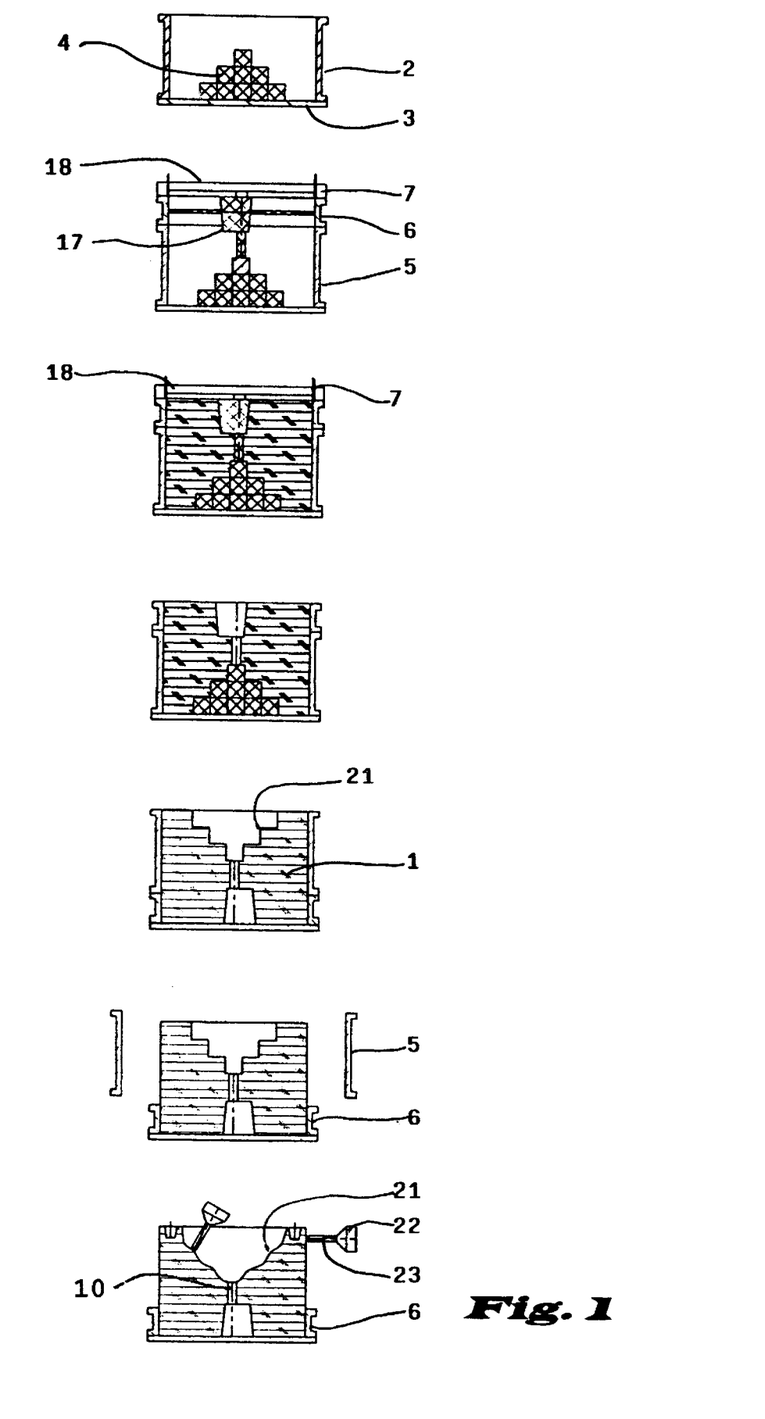
FIG. 1: the sequence of the method used to produce a casting mold.

FIG. 1 is a highly schematic illustration of the sequence of the method for producing a mold blank 1 from cured foundry mold material having a compressive strength of at least 60 to 80 kg/cm² after curing. To make the mold blank 1, known basic mold materials (foundry sand, fire clay, corundum or carbon sand) can be used either in the pure state or in any proportion as a mixture. The binders used can be organic compositions such as resins, novolaks or resols or inorganic binders such as water glass with any desired additives and admixtures such as hardeners, acids, mold-release agents and solvents, and so forth. The self-curing foundry mold material is placed in a molding box 2. The molding box 2 is disposed on a pattern plate 3 as the support for the variable pattern set 4 and the pattern for the pouring and feeding system 17.

Figure 2:
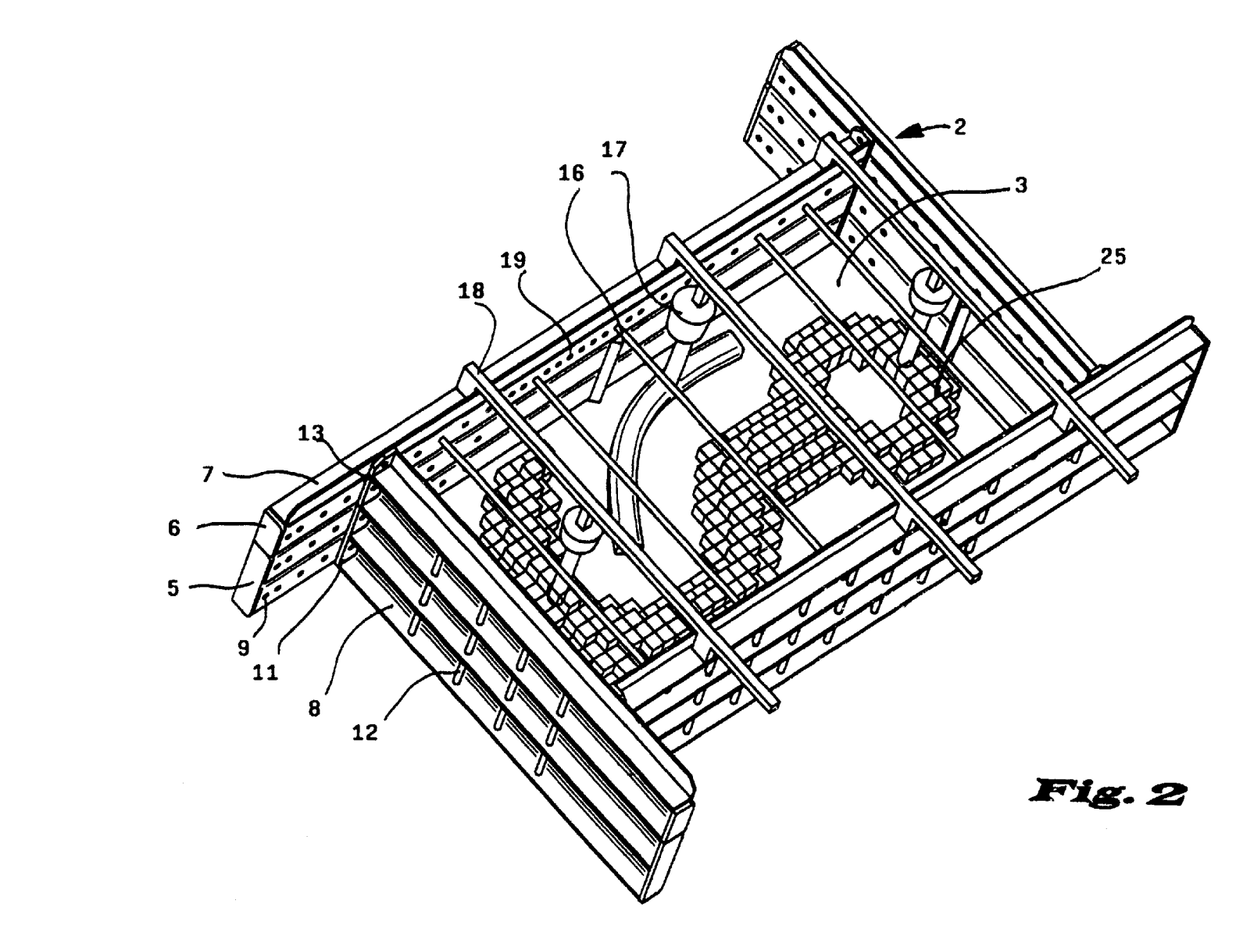
FIG. 2: a variable molding box with a pattern set based on upright parallelepipedal segments (bar segments) for producing the mold blank.

Molding box 2 consists of four side walls 5, an auxiliary frame 6 and a filling frame 7. Molding box 2, auxiliary frame 6 and filling frame 7 is variably adjustable in the grid. Side walls 5 can consist of plural structurally identical channel sections 8 as shown in FIG. 2. The channel sections 8 are of equal length and comprise bores 9 arranged in a grid. The height of side walls 5 can be variably adjusted by changing the number of channel sections 8. The channel sections 8 are connected to one another at the flanges 11. Channel sections 8 comprise as reinforcing elements cross-struts 12 made of round or flat stock and disposed between the two flanges 11. These are arranged at equal distances from one another and are simultaneously used for the form-fitting connection of handling grippers. Thus, the inner dimensions of molding box 2 can be variably adjusted by means of the grid of bores. The grid density of molding box 2 corresponds to the grid density of variable pattern set 4. Auxiliary frame 6 and filling frame 7 can also be adjusted in the grid. Auxiliary frame 6 is placed on side walls 5 and joined to them via suitable connectors. The basic dimensions and the height of molding box 2 can be adjusted in this way. Placed on auxiliary frame 6, in turn, is filling frame 7. The pattern for the pouring and feeding system 17 is suspendedly attached to crossbars 18 that span filling frame 7 and are secured to auxiliary frame 6. The arrangement of the patterns for the pouring and feeding system 17 can be selected as desired. These patterns terminate at the top edge of auxiliary frame 6. Before molding box 2 is filled, reinforcing elements 16 are inserted at still-vacant locations in auxiliary frame 6 and between side walls 5. These serve to stabilize the mold blank 1 for handling and for absorbing the casting pressures. The reinforcing elements 16 can be steel shapes. Auxiliary frame 6 has corresponding round or elongated openings 19 for this purpose.

After filling with cold-curing mold material and subsequent compression, crossbars 18 and filling frame 7 are removed and the mold is skimmed.

After outer-shell strength has been attained, the pattern for pouring and feeding system 17 is withdrawn. The resulting mold blank 1 is rotated 180°. This operation is aided by the cross-struts 12 inserted in side walls 5, form-fitted with a turning device (not shown). Complete curing of the mold material follows. It is essential that the cure not be interrupted for an immediately subsequent machining operation before a given compressive strength has been reached.

The machining allowance of mold blank 1 is then removed by means of machining tools suitable for high-speed machining, and the final casting mold is made.

The side walls 5 of molding box 2 must be removed in order to machine mold blank 1. Auxiliary frame 6 is therefore necessary for clamping and handling mold blank 1. Auxiliary frame 6 is needed to hold the mold blank 1 together when the side walls 5 of molding box 2 are no longer in place, during the lifting and turning of the mold by means of lifting equipment and grippers. In addition, auxiliary frame 6 serves to clamp and position mold blank 1 on the machine platen of a processing machine for milling the mold material and to secure the two halves of the casting mold so that the casting can be poured when the casting mold is used without the side walls 5. For this purpose, each side of auxiliary frame 6 is provided with clamping means that are known per se and therefore are not described in more detail. This securing can thus be done by conventional means, with clamping hooks. The positioning of two halves of the mold with respect to each other so as to absorb the casting pressure can be effected via form-fitting closures in balls of mold material, for example by means of conical pins and receptacles or hemispheres and seats, which are also milled.

Automation of the milling of the mold material, which is intended to encompass high-speed machining and 3-D machining of freeform surfaces, is adversely affected by any accumulation of removed foundry mold material in the machining area, especially in a trough-shaped mold contour 21 of the cured foundry mold material. The consequences are inaccuracies in the surface contour of the casting mold, increased tool wear or damage to the processing machine. There are a number of ways to avoid the accumulation of removed stock by implementing, alone or in combination, the measures described below.

Figure 9:
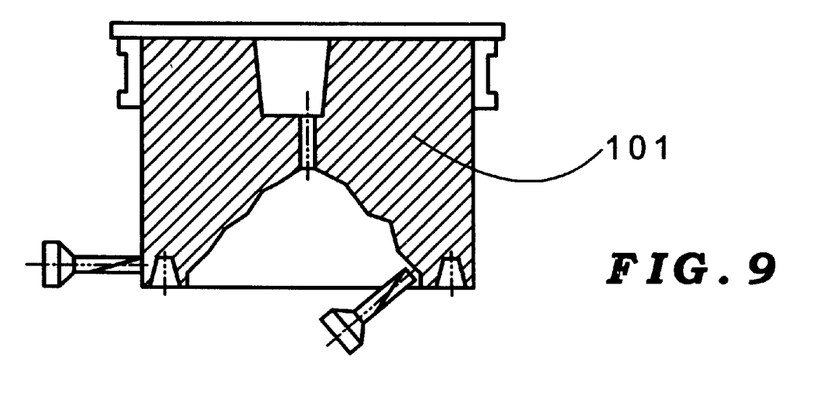
FIG. 9. is an illustration of a rough mold 101 on its head for inverted milling.

The removed stock can be evacuated utilizing the force of gravity by inverted milling. In this case, mold blank 1 is clamped on the machine platen by means of auxiliary frame 6 and pivoted, together with the processing machine, 180° about a horizontal axis. The mold material removed during the milling operation immediately drops out. It is advantageous that the removed mold material can be evacuated during the machining time. Waste mold material can easily be collected and transported away. A casing is provided to protect the main spindle drive, the mold clamping arrangement and the linear guides from the removed stock as it whirls up and falls down.

Figure 10:
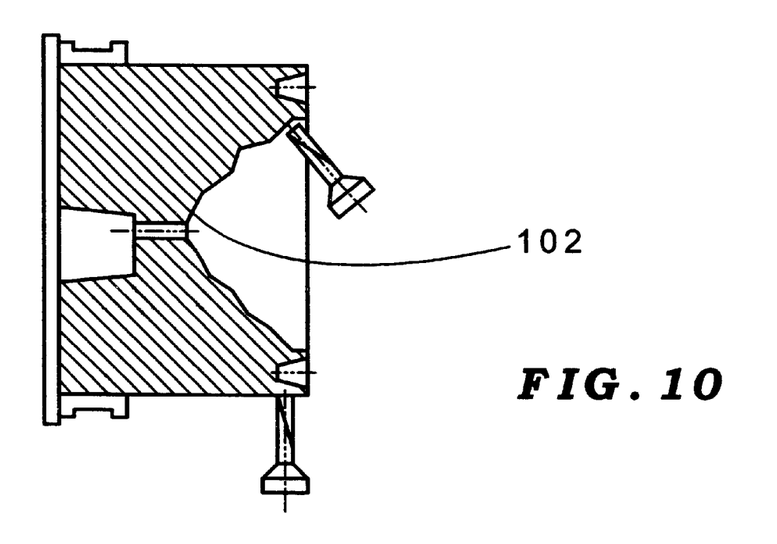
FIG. 10 is an illustration of a vertical rough mold 102.

A simpler way of carrying off the removed stock utilizing the force of gravity can be accomplished by vertical milling. Here, most of the removed stock drops out of a trough-shaped mold contour 21 and the waste mold material can as easily be collected and transported away. The machining shafts, the main spindle drive and the mold clamping system are exposed to less contact with mold material.

Figure 11:
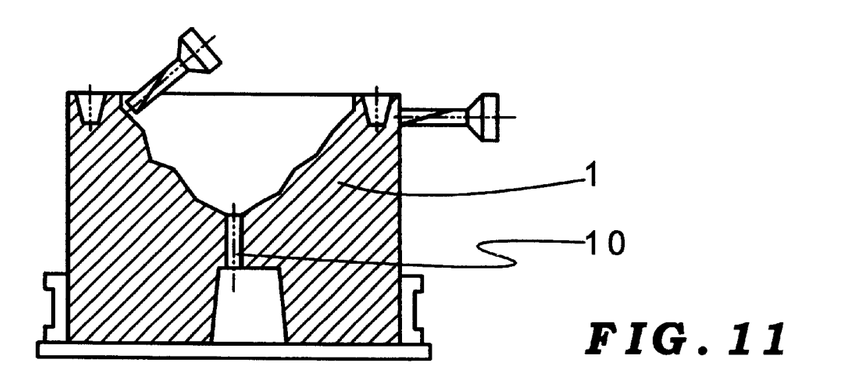
FIG. 11 illustrates the horizontal rough mold of FIG. 1.

During horizontal machining, as shown in FIG. 1, the removed stock can be evacuated by suction, which is particularly advantageous in the case of large mold blanks 1. The mold blank 1 is secured simply by means of auxiliary frame 6, and the removed stock can be evacuated during the machine time through the through-holes 10. This has the advantage that when a surface gantry is used, the linear axes of the processing machine are above trough-shaped mold contour 21 and are relatively well protected against dust by the suctioning of the mold material churned up by the tool.

A disadvantage is the difficulty of evacuating the removed mold material during five-axis machining. In addition, the contours in the casting mold can be damaged by the trailing suction tube connected to the main spindle. The suctioning off of removed stock should therefore be done after machining. It is advantageous if the removed stock is suctioned off in layers. After each layer of stock is removed, a vertical suction tube is substituted into the tool receptacle 22 of the milling spindle. The milling tool 23 is idled during suctioning. The suction tube is connected to the low-pressure exhaust system of the processing machine. The removed stock is exhausted by passage over the workpiece surface close to the contour. There is no possibility of damage to the surface contour of the casting mold. The suction tube can be designed with a relatively large cross section, resulting in a high exhaust capacity with comparatively low energy input for transporting the material. Furthermore, the exhaust system is connected for only a short time, resulting in lower energy consumption and only brief exposure to noise.

A further variant for eliminating the removed stock, which is not detailed in any of the drawings consists in exhausting it through holes in the mold blank 1. For this purpose, holes 10 defined during the processing-machine operations are bored in the mold blank 1, preferably at its deepest points. The bores are subsequently resealed or can serve casting-related functions as feeders or air drains. The suctioning can be done through a machine platen provided for this purpose with exhaust openings arranged in the grid. These openings individually can be sealed or can be opened on being connected to the holes 10 in the mold blank 1.

The mold blank 1 can be produced with the aid of one of the variable pattern sets 4 described in more detail below. The invention is not intended to be limited to these arrangements, however. The following description presupposes the use of CAD/CAM software. The contour of the variable pattern set 4 is generated by means of a CAD system from the contour of the casting mold.

The details are defined during the 3-D design of the mold structure. These details include the zero-point marks, the inner and outer contours of the casting, the arrangement of the parting plane, the arrangement of the cores, including core marks and core clearance, the choice and arrangement of the pouring and feeding system 17, the choice and arrangement of the side walls 5 of the molding box 2, and the choice of the auxiliary frame 6 with the reinforcing elements 16 as well as the selection of the filling frame 7.

The first option for making a mold blank 1 of cold-curing foundry mold materials is to use a variable pattern set 4 composed of bar segments 25. Standardized patterns for the pouring and feeding system 17 are collected in a 3-D library that references existing inventory. Any missing patterns can easily be reconstructed from a variant design. The height of the side walls 5 of the molding box 2 must be greater than the maximum mold depth of the mold blank 1 to be molded. The size of the molding box 2 depends on the size of the pattern set 4, i.e., that of mold blank 1 with reinforcing elements 16. All the contours of the variable pattern set 4 and the parting surfaces include a machining allowance. The surface contour generated for the subsequent casting mold is offset by the amount of the machining allowance and reproduces variable pattern set 4.

Figure 3:
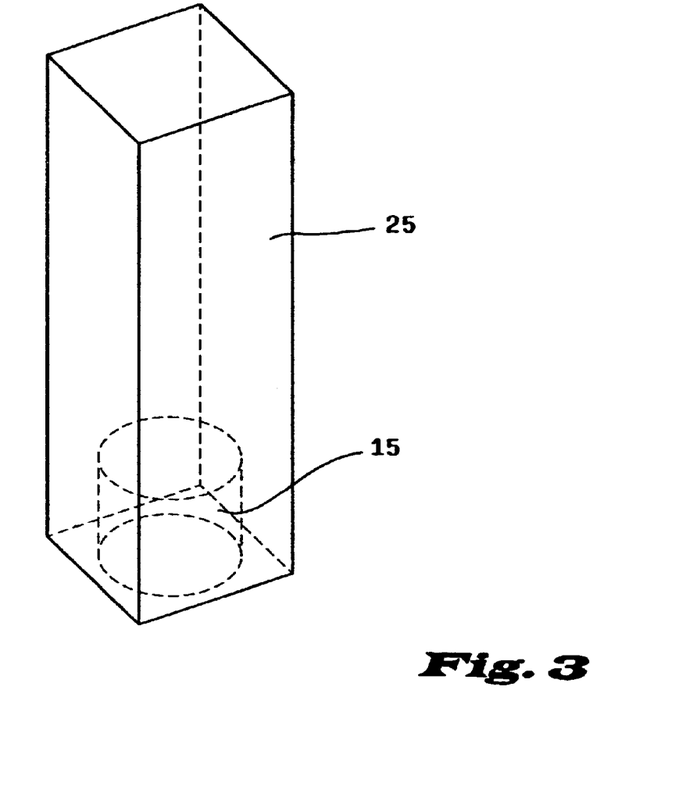
FIG. 3: a bar segment.

The grid of the molding box 2 of FIG. 2 is, in the x-y direction, a multiple of the edge length of the base of an erect bar segment 25, which is shown in FIG. 3. In the CAD system, the mold cavity is filled with bar segments 25 between the offset surface contour and pattern plate 3, which is the base of molding box 2. The bar segments 25 are arranged as in a surface grid in the x-y plane, which is marked on the pattern plate 3 and in the CAD system. The offset surface contour, as the boundary of mold blank 1, must not be penetrated by bar segments 25. Undercuts in the ejection direction are not filled with bar segments 25. The arrangement of bar segments 25 creates variable pattern set 4. The volume of molding box 2 minus pattern set 4 yields, after modeling, mold blank 1. Mold blank 1 enters into the programming of the milling path.

The pattern plate 3 forms the x-y plane of pattern set 4. Pattern plate 3 can be realized as electrically magnetizable. The surface of pattern plate 3 can contain a fine engraving of grid lines. The resulting squares are numbered in a checkerboard pattern to facilitate the mounting of bar segments 25. Pattern plate 3 can be locked together with molding box 2.

Each number is assigned a bar segment 25 of defined length in the z-direction. The grid can also be used to mark the zero point of the workpiece. This assignment can be printed out in a table. The mounting of the positive mold composed of bar segments 25 is done by hand or automatically with a pick-and-place robot. The bar segments can, for example, be made of metal, wood or plastic material and can have the same edge length as described above, but with a tolerance of about −0.1 mm.

The bases of the bar segments 25 are made of steel 15 to create a secure hold with electrically magnetizable pattern plate 3. After the complete mounting of variable pattern set 4, the individual bar segments 25 are secured electromagnetically.

Finally, pattern set 4, constructed of bar segments 25, and the pattern for pouring and feeding system 17 are sprayed with a mold-release agent or covered with film and molding box 2 is filled with cold-curing foundry mold material and compressed. After this filling with cold-curing mold material and subsequent compression, the crossbars 18 and the filling frame 7 are removed and the mold is skimmed. This is followed by the curing of the mold material.

After outer-shell strength has been attained, the pattern for the pouring and feeding system 17 is withdrawn. The resulting mold blank 1 is rotated 180°. Pattern plate 3 with variable pattern set 4 is removed from the mold. After release of the magnetic lock, the bar segments 25 can be removed and reused in any desired arrangement.

The mold blank of FIG. 1 can now be positioned and clamped in the milling machine. Auxiliary frame 6 is used for this purpose. Care must be taken that the workpiece zero point defined on the unmachined part matches the programmed workpiece zero point. The CNC program for milling the mold can be initiated. With the side walls 5 removed, the lateral surfaces of mold blank 1 can be machined. In this way even relatively large mold halves consisting of multiple mold segments can be constructed, since lateral latching devices can be added. Even venting bores are possible. If auxiliary frame 6 is to be positioned behind the side walls of mold blank 1 in order to make relatively large mold segments, adjustable auxiliary frame 6 cannot be used. A made-to-order item is needed for this purpose.

Figure 3A:
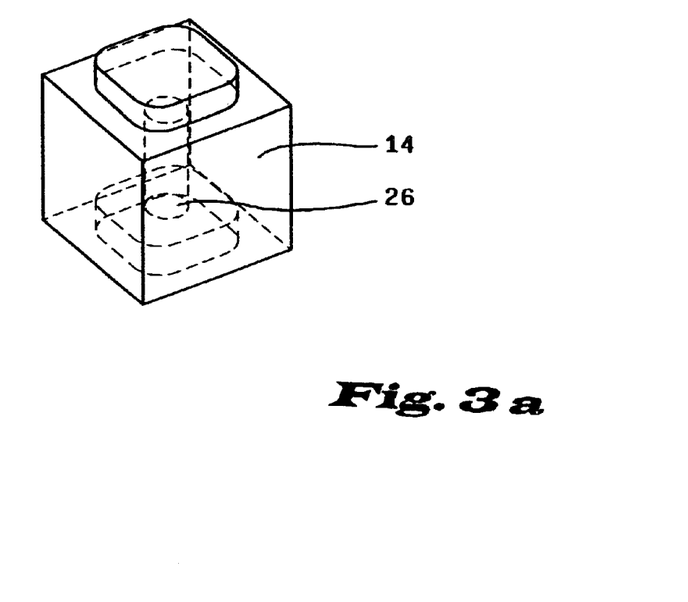
FIG. 3a: a cube segment.

Instead of using bar segments 25 for pattern set 4, it is possible to use cubes 14 provided with threads 26 to facilitate their withdrawal from the mold. The cubes are designed so that they can be interconnected one on top of the other in a form-fitting and therefore torsionally fixed manner, as can be seen from FIG. 3a.

Figure 4:
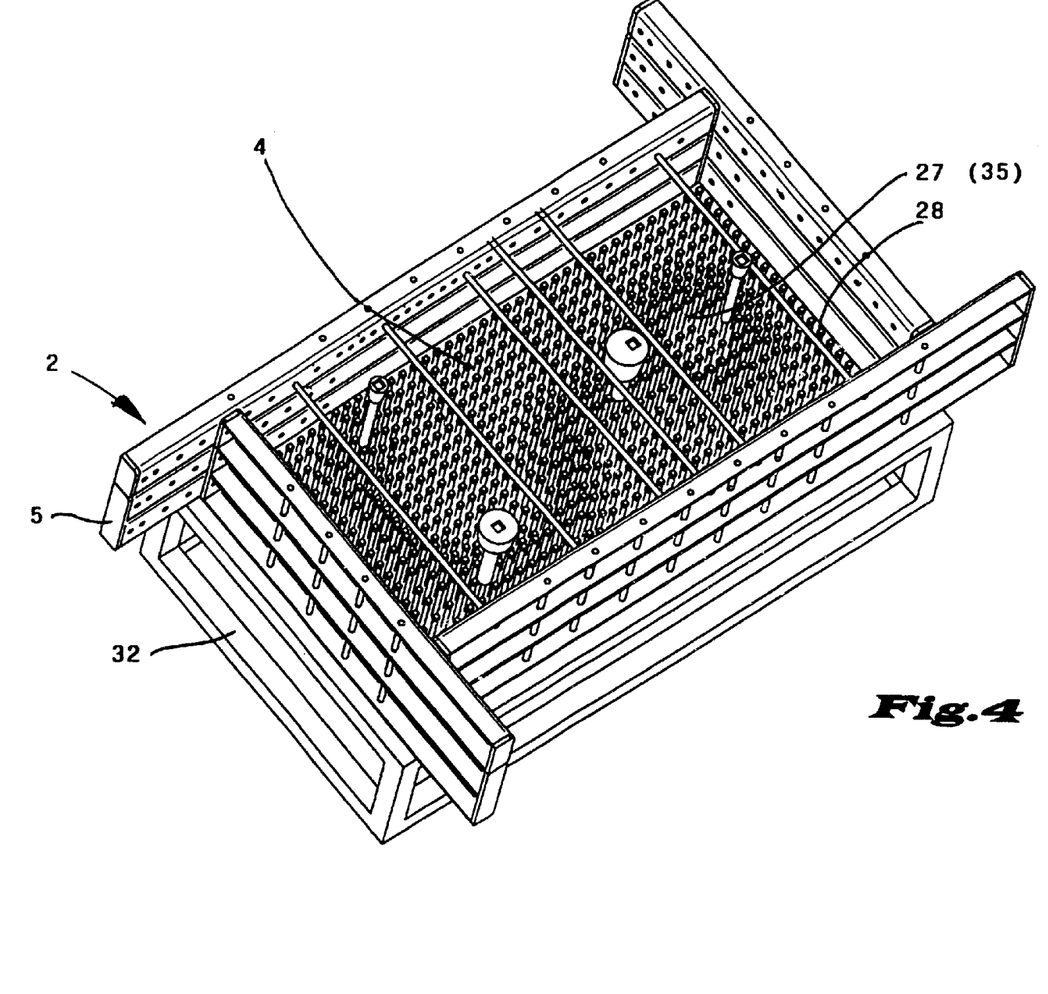
FIG. 4: a molding box plus pattern set with an arrangement of threaded bolts or with an arrangement of clampable round rods.

As a second option, mold blank 1 can be made from cold-curing foundry mold materials by means of a variable pattern set 4 composed of an arrangement of threaded bolts 27 as depicted in FIG. 4.

The grid of molding box 2 shown in FIG. 4 is a multiple of the distance between threaded bolts 27. A CAD system is used to arrange threaded bolts 27 on the plane of pattern plate 3. The threaded bolts 27 determine the offset surface contour by their length. Undercuts in the ejection direction cannot be represented.

Figure 5:
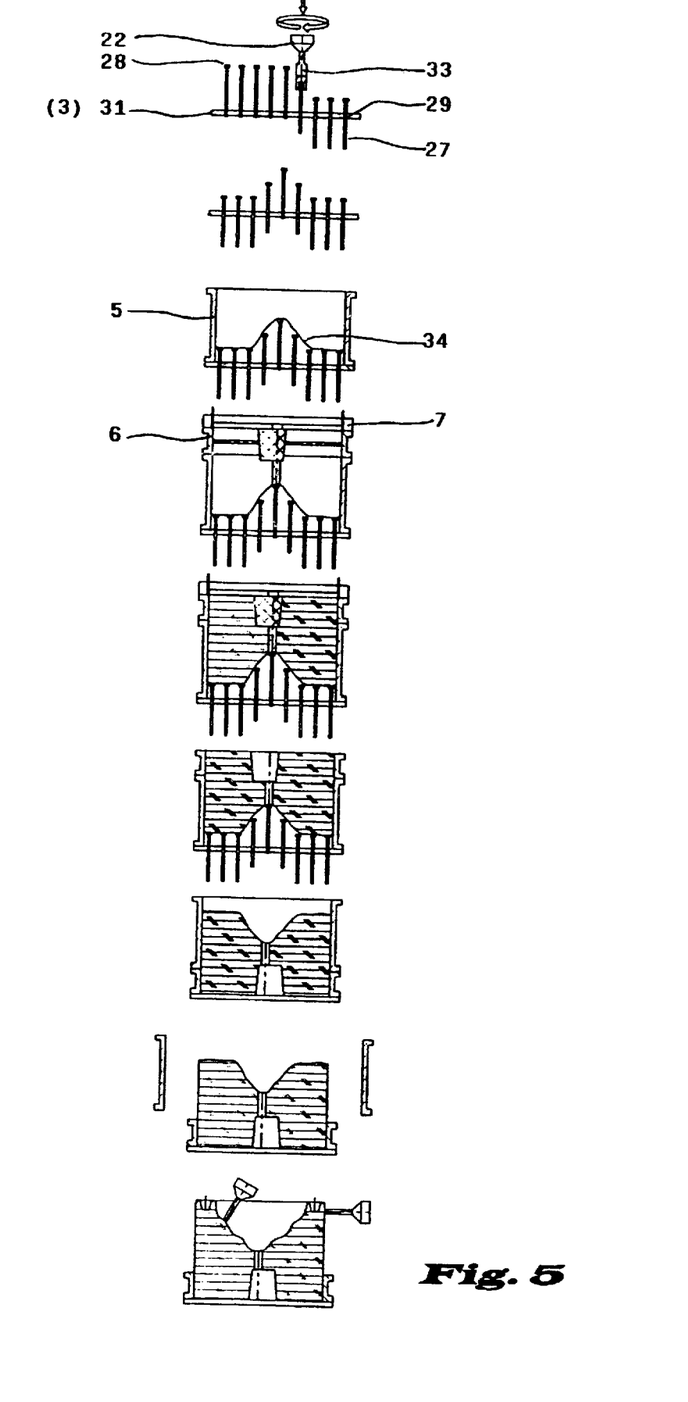
FIG. 5: production of the mold blank using an arrangement of threaded bolts.

Pattern set 4 is produced by the defined tightening of plural threaded bolts 27 in threaded bores 29, as illustrated schematically in FIG. 5. The threaded bores 29 are disposed in a roughly 12-mm-thick metal plate 31, for example of steel sheet, which is attached to a frame 32 about 200 mm high. The threaded bores 29 can be arranged in a grid in the X-and Y-directions. The threaded bolts 27 are screwed into threaded bores 29. All threaded bolts 27 are adjusted to a uniform height from the top edge of cylinder bolts 27 to metal plate 31. Each cylinder bolt 27 has a head 28 that is about 10 mm high, in the manner of a hexagonal-recess screw or the like. This creates a form-fit with a screwdriver 33. Each threaded bolt 27 is therefore able to execute a stroke within the height of the frame 32. This represents the maximum depth that can be molded by means of pattern set 4. Pattern plate 3 forms the X-Y plane of pattern set 4, and the grid of thread bolts 27 can be transferred to it. Each grid point becomes a height value, which in the selected embodiment can range from 10 to 190 mm, and to which respective threaded bolts 27 are assigned proceeding in the Z-direction of pattern plate 3. This assignment is used to program the milling machine for the tightening of threaded bolts 27. The transfer of the surface contour to pattern set 4 can take place in the milling machine. The milling machine now functions as a handling robot. The functions of the X-, Y- and Z-axes and of the work spindle are then used for bolt-tightening in a manner similar to thread-cutting. A prerequisite for this is that the control system of the machine support the thread-cutting without a threading attachment. For this purpose, pattern set 4 is positioned and clamped in the machine. Care must taken to ensure that the workpiece zero point defined on pattern set 4 matches the programmed workpiece zero point. A screwdriver 33 is fastened in tool holding fixture 22, and when brought into contact with the head 28 realized as a screw head, compensates for any misalignment of the angle of rotation of the threaded bolt 27 to effect engagement. Threaded bolt 27 is moved to its corresponding position in the X- and Y-directions. By clockwise rotation of the work spindle and adjustment in the Z-direction, threaded bolt 27 is tightened and brought to the defined height. Once all the threaded bolts 27 have been adjusted, pattern set 4 is removed from the machine. A shape-yielding textile fabric 34 is laid or stretched over the pattern set 4 represented by threaded bolts 27. The screw-fastened side walls 5 of molding box 2 are placed on pattern set 4. Pattern set 4 is then covered with a thin film. The above-described auxiliary frame 6 and the filling frame 7 are then put in place, the pouring and feeding system 17 is mounted, and the mold is filled with cold-curing foundry mold material and compressed.

After outer-shell strength has been attained, the mold blank is rotated 180° and pattern set 4 is withdrawn. The side walls 5 of the molding box 2 and the fabric 34 and separating film are removed. The pattern set 4 can be reused after all the threaded bolts 27 have been readjusted to a uniform height. This operation can be done by hand or automatically.

Figure 6:
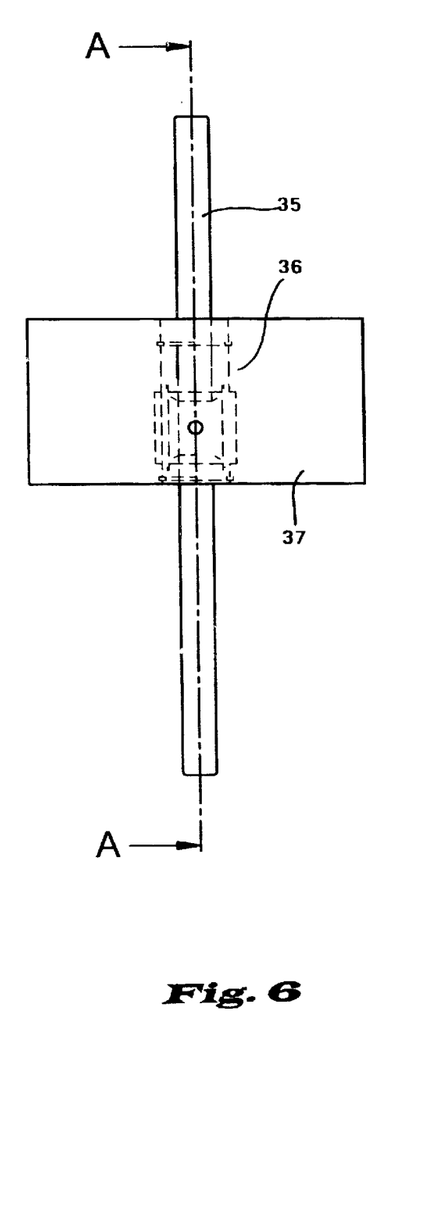
FIG. 6: a clampable round rod.
Figure 7:
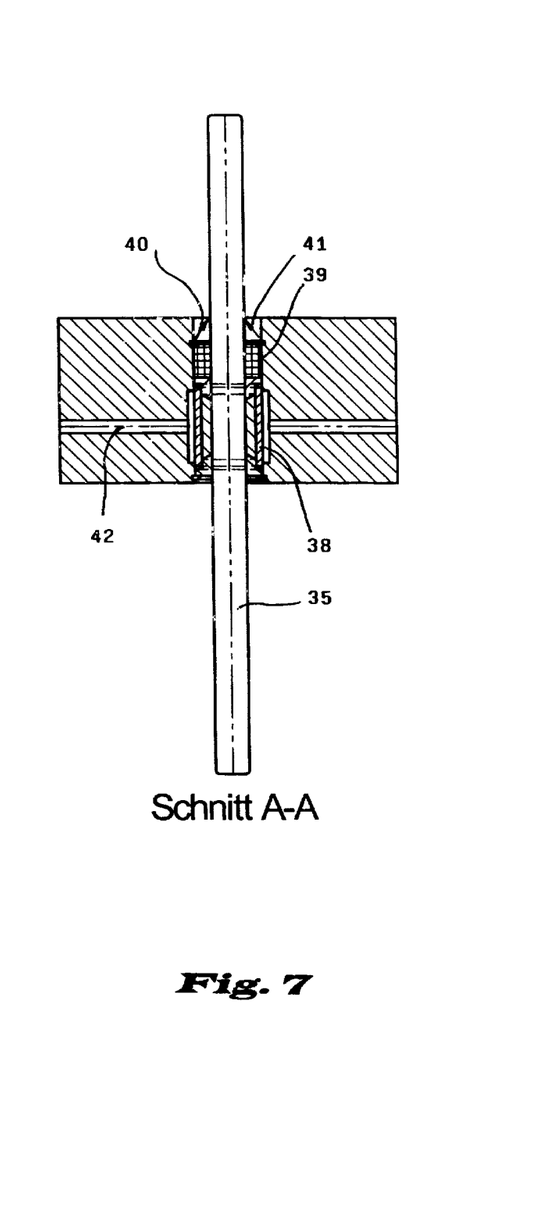
FIG. 7: the clampable round rod of FIG. 6 in section.
Figure 8:
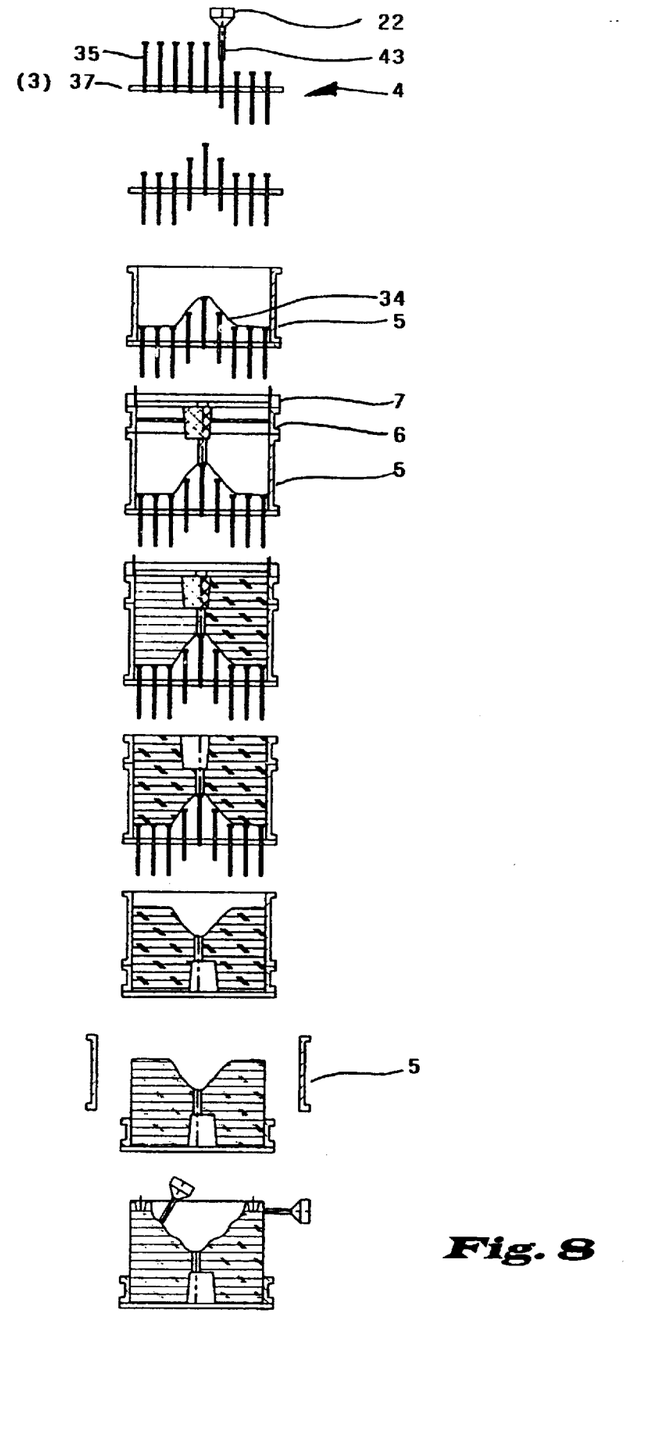
FIG. 8: production of the mold blank using an arrangement of clampable round rods.

A further variant for producing the mold blank 1 from cold-curing foundry mold material by means of a variable pattern set 4 includes an arrangement of clampable round rods 35, which are depicted in FIGS. 6 to 8. Reference is also made to FIG. 4.

The grid of the molding box 2, which is identical in plan view to the molding box 2 of FIG. 4, is a multiple of the distance between the round rods 35. A CAD system is used to arrange the round rods 35 in the grid on the plane of pattern plate 3. The round rods 35 are limited in length by the offset surface contour. Undercuts in the ejection direction cannot be represented.

The pattern set 4 is produced by pressing the round rods 35 into clamping recesses 36 to a defined extent. Clamping recesses 36 are disposed in a thick metal plate 37, which is depicted in FIG. 6 and whose size is assumed in the case of the exemplary embodiment to be 50 mm. Plate 37 is fastened to the frame 32 of FIG. 4, which is of approximately the same height as the side wall 5 of the molding box 2. The clamping recesses 36, which are shown in section in FIG. 7, each consist of a hydraulically actuated clamping bush 38, which is available commercially, and a plastic clamping ring 39, two bore guard rings 40 and two stripping rings 41. The clamping recesses 36 are disposed in a grid of about 30 mm in the X- and Y-directions. Plastic clamping rings 39 are seated above clamping bushes 38 and permit axial displacement of the round rods 35 in response to only light force. Plastic clamping rings 39 are intended to keep round rods 35 from dropping out when clamping bushes 38 are released. A light press-fit between round rods 35 and clamping rings 39 has been selected. A hydraulic-supply-line bore 42 leads to each clamping bush 38. In order for this supply line to be laid out in the smallest possible space and in one plane, it is practical for plate 37 to be composed of strip-shaped segments of equal length. The hydraulic-supply-line bores 42 are disposed in the strip-shaped segments and are connected to one another. In the exemplary embodiment, the round rods 35 are about 240 mm long and 10 mm in diameter and are ground to the inner diameter of the clamping bushes 38 to achieve a transition fit. Each round rod 35 is able to execute a stroke of about 180 mm. This represents the maximum molding depth of molding box 2.

The grid of round rods 35 is transferred to pattern plate 3. Each grid point is assigned a height of about 10 to 190 mm of the round rod 35 concerned, proceeding from the base in the Z-direction. This assignment is used to program the milling machine for the pressing in of the round rods 35. The surface contour of pattern set 4 as depicted in FIG. 8 can be created in the milling machine. The milling machine now functions as a handling robot. The functions of the X-, Y- and Z-axes are used for this purpose. The pattern set 4 is positioned and clamped in the machine. Care must be taken to ensure that the workpiece zero point defined on pattern set 4 matches the programmed workpiece zero point. A plunger 43 is secured in tool holding fixture 22 while the work spindle is stopped. Round rod 35 is moved to its corresponding position in the X- and Y-directions. Plunger 43 is moved in the Z-direction to cause round rod 35 to be pressed into clamping recess 36 and brought to a defined height. Once all the round rods 35 have been adjusted, they are locked in place by hydraulic clamping pressure. The hydraulic pressure is generated by means of a hand pump attached to pattern set 4. The hydraulic clamping is maintained during the curing phase of the mold material. Pattern set 4 is then removed from the machine. A shape-yielding textile fabric 34 is laid or stretched over the pattern set 4 formed by round rods 35. The screw-fastened side walls 5 of molding box 2 are placed on pattern set 4. Pattern set 4 is then covered with film. The above-described auxiliary frame 6 and a filling frame 7 are then put in place, the pouring and feeding system 17 is mounted, and the mold is filled with cold-curing foundry mold material.

After outer-shell strength has been attained, the mold blank is rotated 180° and pattern set 4 is withdrawn. The side walls 5 of the molding box 2 and the textile fabric 34 and the film are removed. The pattern set 4 can be reused after the hydraulic clamping has been terminated and all the round rods 35 have been readjusted to a uniform height of about 190 mm. This operation is done by hand or automatically.

What is claimed is:

1. A method for producing a break-mold for metal castings, wherein the break-mold is useful both for the manufacture of cast prototype parts and for single pieces in the small and medium-size range of dimensions, the method comprising:

before machining by high speed milling, generating the contour of a rough mold by means of a CAD system from the contour of a casting mold;

providing a pattern device;

transferring by means of the CAD system the contour of a rough mold to the pattern device to produce the initial mold, which includes a volume of the desired contours of the casting mold after the high speed milling plus a machining supplement that will be removed with machining by high speed milling;

providing a molding box around the pattern device with the contour of the rough mold;

filling the mold box with foundry mold materials containing hardenable binders to form the contour of the rough mold in the mold materials;

removing the mold box and completely hardening the mold materials to form the rough mold having a compressive strength of at least 60 to 80 kg/cm2; and machining the rough mold by high speed milling to form the casting mold by removing the machining supplement contained in the rough mold.

2. The method of claim 1, wherein the pattern device comprises a pattern plate that can be locked together with said molding box and a variable pattern set (4).

3. The method of claim 1, the method further comprising removing material waste during the high speed milling utilizing the force of gravity by inverted milling, whereby the rough mold is arranged standing on its head.

4. The method of claim 1, the method further comprising removing stock utilizing the force of gravity during the high speed mining, whereby the rough mold is arranged vertically.

5. The method of claim 1, the method further comprising providing the rough mold with holes and removing material waste downwardly by suction through holes in the mold blank.

6. The method of claim 1, the method further comprising removing material waste in layers by suction by means of an exhaust system by passage of a suction device over the mold contour close to said desired contour, during non-machine time after three-to-five-axis horizontal machining.

7. The method of claim 1, wherein the pattern device comprises a variable pattern set comprising a plurality of cubes disposed in a space lattice having X-, Y- and Z-directions, each cube having an edge length that is identical to the spacing of said space lattice in the X-, Y- and Z-directions, and wherein the molding box comprises an imaginary division that is a multiple of the edge length of a cube.

8. The method of claim 1, wherein the pattern device comprises a variable pattern set comprises a plurality of bar segments having a steel base that can be secured on a magnetizable pattern plate.

* * * * *